Dec. 13, 1932.  C. R. ALDEN ET AL  1,890,663
SLIP BUSHING
Filed April 18, 1929
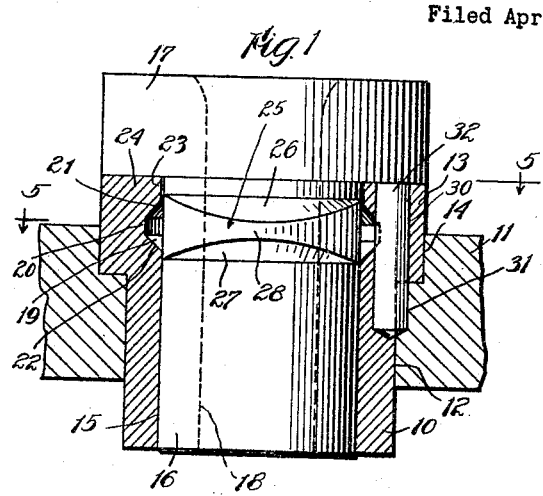
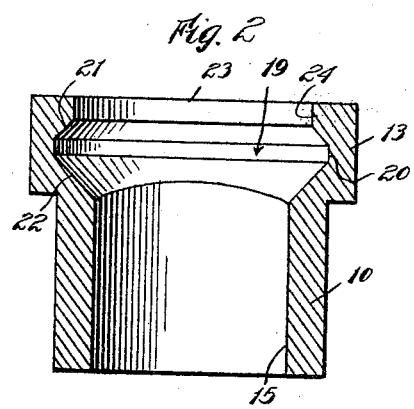
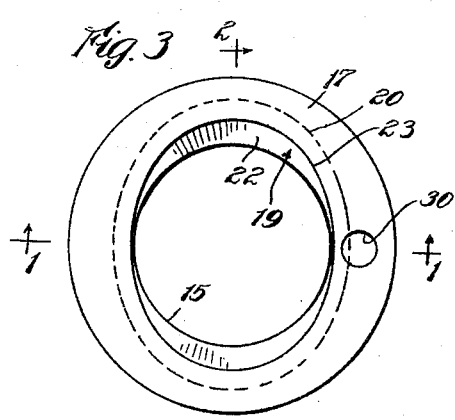
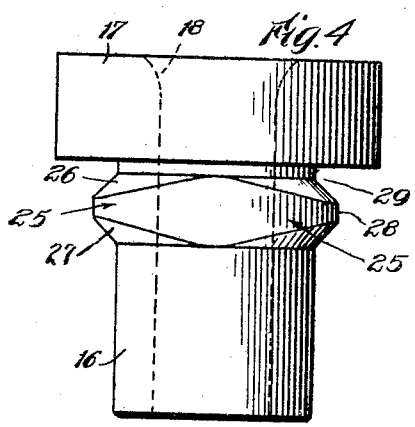
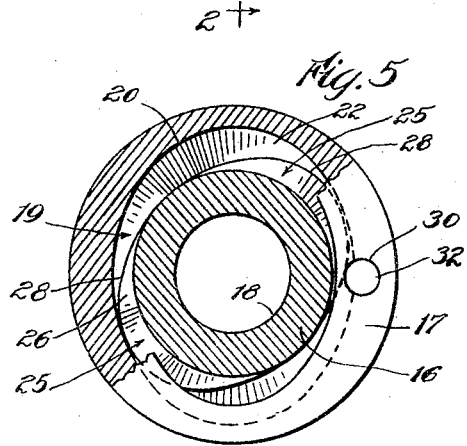
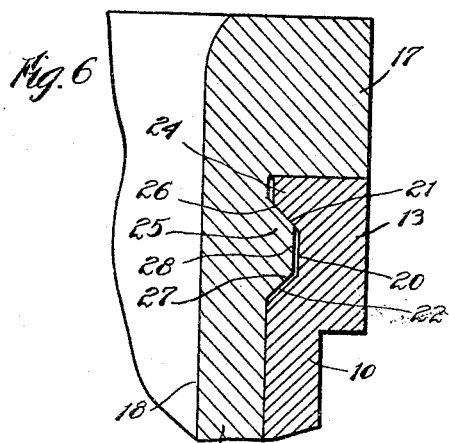
Inventors
Carroll R. Alden
Christian A. Birkebak
By Churchill Parker & Carlson
Attys Patented Dec. 13, 1932

1,890,663

UNITED STATES PATENT OFFICE

CARROLL R. ALDEN AND CHRISTIAN A. BIRKEBAK, OF DETROIT, MICHIGAN, ASSIGNORS TO EX-CELL-O AIRCRAFT AND TOOL CORPORATION, OF DETROIT, MICHIGAN, A CORPORATION OF MICHIGAN

SLIP BUSHING

Application filed April 18, 1929. Serial No. 356,088.

The present invention relates to improvements in slip bushings, and has particular reference to new and improved lock means therefor.

Slip bushings commonly comprise a liner mounted in a suitable support, such as a jig, and a bushing mounted therein. Lock means is provided to secure the bushing removably in the liner. Plain bushings which are not to be removed until worn out may be locked firmly in place. Bushings that are intended to be removed frequently, as for example to accommodate different kinds of work, preferably are held in place by means of a free lock, i. e. an interlock serving to prevent withdrawal or rotation of the bushing without wedging or clamping the latter tightly in position. Lock means of this character provided heretofore, are subject to the objections that they do not effect the desired locking action and do not possess the desired strength to prevent failure of the metal, these objections being due in part to the weakness of the interlocking parts and the concentration of stress at one point, and that they are not convertible from a "free lock" to a "tight lock" and vice versa, and are movable only in one direction to effect a lock.

The primary object of the present invention therefore resides in the provision for slip bushings of a new and improved lock means in which the interlocking parts are of sufficient strength to resist successfully the stresses and jars to which they are subjected in use, and in which the applied forces are taken up at a number of spaced points.

Other objects reside in the provision for slip bushings of novel lock means which may be turned in either direction to effect the locking action, thereby increasing its range of usefulness, and which is readily convertible from a "free lock" to a "tight lock" and vice versa.

A more specific object is to provide a new and improved slip bushing having a self-contained elliptical lock between the liner and the bushing.

Still another object is to provide a slip bushing of the foregoing character which when converted into a "tight lock" bushing has a more definite wedging action than possible heretofore.

A further object resides in the provision of a novel slip bushing which can be converted from a "tight lock" to a "free lock" and vice versa by the insertion or removal of a stop member, and in which the stop member when in place is effective to lock the liner against rotation in its support.

Further objects and advantages will become apparent as the description proceeds.

In the accompanying drawing, Figure 1 is a view of a slip bushing embodying the features of our invention, the bushing being shown in elevation, and the liner being sectioned along line 1—1 of Fig. 3.

Fig. 2 is a sectional view of the liner taken along line 2—2 of Fig. 3.

Fig. 3 is a plan view of the liner.

Fig. 4 is a side elevational view of the bushing.

Fig. 5 is a view of the slip bushing assembly sectioned substantially along line 5—5 of Fig. 1, and showing the parts in a "free lock".

Fig. 6 is a fragmentary sectional view showing the parts in a "tight lock".

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawing, the slip bushing constituting the exemplary embodiment of our invention comprises a liner 10 which preferably is cylindrical, and which is adapted to be seated in a suitable support, such as a jig 11. To this end, the liner 10 is snugly disposed in a bore 12 in the support 11, and has a peripheral head 13 on its upper end resting in a notch 14 in the upper end of the bore.

The liner 10 is formed with a central axial bore 15 adapted to receive a bushing 16 having a snug sliding fit therein. The bushing 16 is provided with a head 17 on its upper end adapted to seat against the top of the head 13, and is formed with an axial bore 18 opening therethrough for the reception of a tool (not shown) in use.

Self-contained means is provided for locking the bushing 16 in the liner 10 against rotational or axial movement. To this end, an elliptical groove 19 is formed in the head 13 in symmetrical alignment with the bore 15. The groove 19 comprises an inner root surface 20 extending longitudinally of the liner 10, and upper and lower side surfaces 21 and 22 inclined upwardly and downwardly respectively. The maximum minor axis of the groove 19 is longer than the diameter of the bore 15. The lower side surface 22 thus merges into the upper end of the bore 15. The head 13 is formed with an opening 23 in its upper surface. This opening preferably is elliptical in form, and in alignment with the groove 19, with its minor axis slightly longer than the diameter of the bore 15. The opening 23 interrupts the upper side surface 21, and the two define an elliptical ledge 24 overlying the groove 19. This ledge is strong, and is uniform in thickness about its periphery. While we have described the groove 19 as being elliptical, it will be obvious that certain changes in form may be made without departing from the broad concept of the invention.

The construction just described constitutes one of the elements of the lock means. The other of the elements is formed on the bushing 16, and in the present instance comprises two similar diametrically opposed lobes 25. Preferably, these lobes are formed in the following manner: a peripheral concentric enlargement is formed on the bushing 16 slightly below the head 17. The upper and lower side surfaces 26 and 27 then are beveled, and the peripheral surface is shaped substantially into the form of an ellipse, with its minor axis equal to the diameter of the bushing 16. Hence, the surfaces 26 and 27 are conical segments, and the peripheral surfaces 28 of the lobes 25 are elliptical. The ellipse defined by the lobes 25 is slightly smaller than the opening 23, so that the lobes may be inserted freely therethrough into registration with the groove 19. The head 17 and the lobes 25 define a space 29 adapted to receive the edge of the ledge 24 upon relative rotation.

The lock means thus far described will serve to effect a "tight lock" between the liner 10 and the bushing 16 upon relative rotation in either direction. To effect this lock, the bushing 16 is inserted into the liner 10, and is turned therein in the direction that the tool to be used will turn. This turning movement serves to bring the surface 26 of each lobe 25 into tight wedging engagement with the surface 21, thereby drawing the head 17 tightly against the head 13 (see Fig. 6). The action is definite and the construction is sturdy. The stresses are applied at two spaced points thereby insuring balance and a strong locking action.

The character of the action obviously may be varied by changing the spacing of the lobes 25 from the head 17. Thus, by increasing this spacing sufficiently, the sides of the lobes 25 can be brought into engagement with both sides of the groove 19.

To permit conversion of the lock means to effect a "free lock" instead of a "tight lock", a suitable opening, preferably a bore 30, is formed in the liner 10 to intersect the groove 19. The bore 30 opens downwardly from the top of the head 13, partly into the groove 19 on the minor axis, and to a point substantially below the head. The lower end of the bore 30 intersects the outer periphery of the liner 10, and is complemental to a bore segment or groove 31 in the periphery of the bore 12. A pin 32 is adapted to be inserted in the bore 30, and when in position constitutes a stop adapted to engage the periphery of one of the lobes 25 upon rotation of bushing 16 to effect a lock. The pin 32 engages the lobe 25 before a "tight lock" is effected, and the coacting angles are such that a "free lock" is obtained (see Fig. 5). It will be evident that the "free lock" can be obtained upon rotation of the bushing 16 in either direction, and that the lock means can be altered to effect a "tight lock" or a "free lock" merely by removing or inserting the pin 32. The lower end of the pin 32 is adapted to engage the bore segment 31, and thereby to lock the liner 10 against rotation in the bore 12.

The pin 32 does not constitute a positive or direct abutment. On the contrary, the periphery of the engaging lobe 25 contacts with a wiping action at an angle too great to effect a tight lock, but small enough to effect a setting of the parts. This setting prevents the parts from shaking loose, but permits the bushing to be removed readily by hand.

In the "tight lock" bushing, the coaction between the true conical surfaces of the lobes 25 with the beveled elliptical surfaces 21 results in contact over a relatively large surface.

We claim as our invention:
1. A slip bushing comprising, in combination, a liner having a bore, said bore being formed with a coaxial elliptical groove in its periphery, the sides of said groove being inclined inwardly and apart, said liner having an elliptical opening to said groove and coaxial with said bore and in alignment with said groove, a bushing slidably disposed in said bore, a head on said bushing adapted to engage one end of said liner, and a pair of diametrically opposed lobes formed on said bushing in spaced relation to said head and disposed in said groove, the sides of said lobes being conical in form, said lobes being adapted to coact with one side of said groove to clamp said head against said liner upon relative rotation of said bushing in either direction.

2. A slip bushing comprising, in combination, a liner having a central aperture, a concentric oblong recess in one end of said aperture and a concentric oblong opening to said recess, a stop member in said recess, and a bushing disposed in said aperture and having a lateral lobe disposed in said recess and adapted to be rotated in either direction to move into interlocking relation therewith and into wiping engagement with said stop member, said stop member and said lobe engaging at an angle of a size affording a slight retaining free-lock contact and preventing a tight-lock wedging contact.

3. A slip bushing comprising, in combination, a liner having an aperture, said aperture being formed with an oblong enlargement defining an oblong peripheral ledge, a bushing disposed in said aperture and having an oblong projection disposed in said enlargement for movement into wedging engagement with said ledge, and stop means removably disposed in said enlargement for limiting said movement to a free interlock between said ledge and said projection.

4. A slip bushing comprising, in combination, a liner having a bore, said bore being formed with a coaxial oblong groove, one side of said groove being inclined, a bushing slidably disposed in said bore, and a pair of diametrically opposed lobes formed on said bushing and disposed in said groove, the sides of said lobes adjacent said inclined side being conical in form, said lobes being adapted to coact with said inclined side of said groove at spaced points to clamp said bushing in said liner.

5. A slip bushing comprising, in combination, a liner having a bore, said bore being formed adjacent one end with an elliptical ledge, a stop member removably disposed on the under side of said ledge at the minor axis thereof, and a bushing slidably disposed in said bore, said bushing being formed with a pair of diametrically opposed lobes adapted to be moved past said ledge and to be rotated into interlocking engagement therewith and into free-lock abutting engagement with said stop member and when said member is removed into tight-lock wedging engagement with said ledge.

6. A slip bushing comprising, in combination with a support, a liner seated in said support, a bushing slidably disposed in said liner, coacting parts on said liner and said bushing adapted when unobstructed to be relatively movable into and out of interlocking relation and also tight-lock wedging engagement, and a stop pin adapted to be removably inserted between said parts to obstruct said movement so as to limit said parts to said interlocking relation and to prevent said wedging engagement.

7. A slip bushing comprising, in combination with a support, a liner seated in said support, a bushing slidably disposed in said liner and said bushing relatively, coacting parts on said liner movable into and out of interlocking relation and also lock wedging engagement, and a stop pin removably inserted between said parts to limit said movement to an interlocking relation and to prevent said wedging engagement, said pin also projecting between said support and said liner to secure said liner against relative rotation.

8. A slip bushing comprising, in combination, a liner having a bore, said bore being formed adjacent one end with an elliptical groove in its periphery, and with an elliptical opening to the outer side of said groove defining a ledge, a stop member removably disposed at the minor axis of said groove, and extending therethrough, and a bushing slidably disposed in said bore, said bushing being formed with a pair of diametrically opposed lobes adapted to pass through said opening into registration with said groove, and adapted to be rotated laterally in said groove into coacting engagement with said stop member.

9. A slip bushing comprising, in combination with a support, a liner seated in said support, said liner having a head on one end and a central bore, said bore having an elliptical enlargement in said head, and an elliptical opening extending from said enlargement to the outer surface of said head, a bore extending downwardly through said head and intersecting said enlargement, said last mentioned bore extending substantially beyond said head and intersecting the outer periphery of said liner, a complemental recess to said last mentioned bore in said support, a bushing slidably disposed in said first mentioned bore and having a head adapted to seat against said first mentioned head, said bushing having a peripheral enlargement disposed in said bore enlargement, and a pin disposed in said last mentioned bore, said pin being adapted to act as a stop for said enlargement on said bushing and serving to lock said liner against relative rotation in said support.

10. A slip bushing comprising in combination, a liner having a bore, said bore being formed with an elliptical groove in its periphery, the sides of said groove being inclined inwardly and apart, said liner having an elliptical opening to said groove in alinement with said groove, a bushing slidably disposed in said bore, a head on said bushing adapted to engage one end of said liner, an elliptical enlargement on said bushing adapted for movement through said opening into registration with said groove and for rotation in either direction into tight wedging engagement with said groove, and a stop pin removably disposed in said groove at the minor axis thereof for a free-locking wedge engagement with said projection.

In testimony whereof we have hereunto affixed our signatures.

CARROLL R. ALDEN.
CHRISTIAN A. BIRKEBAK.

CERTIFICATE OF CORRECTION.

Patent No. 1,890,663.  December 13, 1932.

CARROLL R. ALDEN, ET AL.

It is hereby certified that error appears in the printed specification of the above numbered patent requiring correction as follows: Page 3, line 72, claim 7, strike out the words "and said bushing relatively" and insert the same after "liner" in line 73 of same claim; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.